W. B. BURKE.
PACKING JOINT.
APPLICATION FILED MAY 22, 1914.

1,365,151.

Patented Jan. 11, 1921.

WITNESSES=
O. M. Kappler
Thos. H. Fay.

INVENTOR
Wilbur B. Burke
BY
Fay & Oberlin
ATTORNEYS-

UNITED STATES PATENT OFFICE.

WILBUR B. BURKE, OF CLEVELAND, OHIO, ASSIGNOR TO A. SCHRADER'S SON, INCORPORATED, OF BROOKLYN, NEW YORK, A CORPORATION OF NEW YORK.

PACKING-JOINT.

1,365,151.        Specification of Letters Patent.     Patented Jan. 11, 1921.

Original application filed November 13, 1911, Serial No. 660,100. Divided and this application filed May 22, 1914. Serial No. 840,161.

*To all whom it may concern:*

Be it known that I, WILBUR B. BURKE, a citizen of the United States, and a resident of Cleveland, county of Cuyahoga, and State of Ohio, have invented a new and useful Improvement in Packing-Joints, of which the following is a specification, the principle of the invention being herein explained and the best mode in which I have contemplated applying that principle, so as to distinguish it from other inventions.

The present improvements, relating as indicated to packing joints, have regard to the provision of a packing joint especially adapted for use in connection with tire valves and the like, which require to be constructed of two tubular parts threaded together and yet must be proof against leakage of air through the joint, as fully set forth in applicant's co-pending application, filed November 13, 1911, Serial No. 660,100, now Patent No. 1,101,008, granted June 23, 1914, out of which the present application has been divided. The usefulness of my packing joint is not, of course, limited to this one field, but it may be applied with equally successful results in a variety of connections where a simple and effective packing is desired. The invention consists of the means hereinafter fully described and particularly pointed out in the claims.

The annexed drawing and the following description set forth in detail certain mechanism embodying the invention, such disclosed means constituting, however, but one of the various mechanical forms in which the principle of the invention may be used.

In said annexed drawing:—

Figure 1:
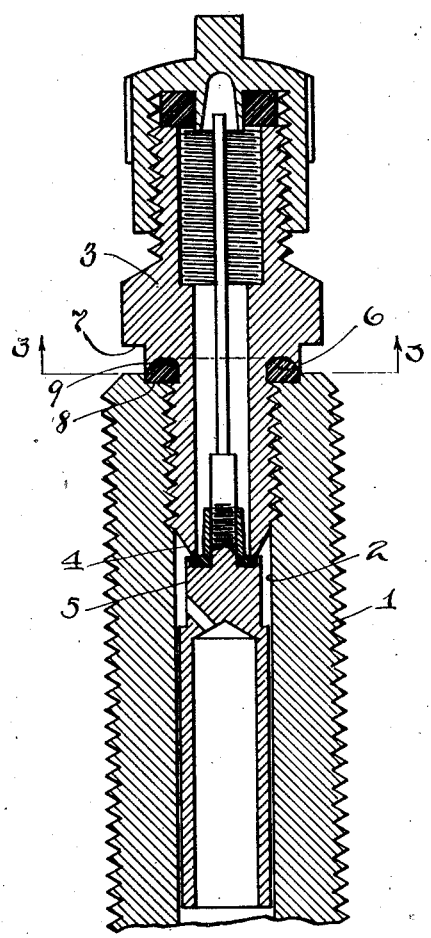
Figure 2:
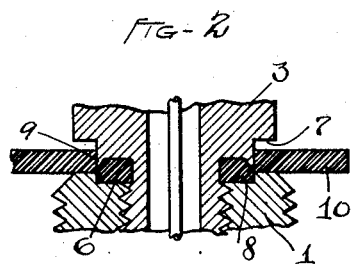
Figure 3:
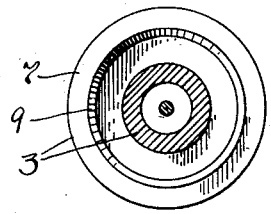

Figure 1 is a sectional view of a portion of a tire valve showing my improved packing joint in its completed form; Fig. 2 is a view similar to Fig. 1, but showing such joint in a preliminary stage of assembly; and Fig. 3 is a bottom plan view of one of the parts entering into the joint.

The body 1 of the valve is shown as of usual tubular construction, the outer portion, which alone appears in Fig. 1, being externally threaded in order to receive a dust cap (not shown), which incloses the portion of the body that normally projects through the wheel rim or felly. The bore 2 of such valve body is internally threaded for a short distance from the outer end in order to receive an externally threaded seat-member 3 that projects beyond the end of the valve body and is threaded to receive a cap. The inner end 4 of member 3 forms an annular valve seat having a relatively sharp edge that is spaced clear of the surrounding wall of the body 1, so that when the coöperating face of the valve 5 is pressed thereagainst, the opening 2 through the body is effectively closed or sealed.

For such sealing to be of use, it is, of course necessary that the joint between the body 1 and the member 3 be air-tight, and to this end a washer or gasket 6, of softer material than the metal of which the parts in question are composed, is introduced between the outer end of the body and the shoulder 7 on the member. Such gasket will ordinarily be of lead, although rubber or the like may be used. To receive this washer the end of the body is formed with an annular recess 8, while the shoulder on the seat member is provided with a circular lip 9 having a sharp cutting edge so disposed as to lie within the outer edge of the recess 8 in the body member, and thus have a telescoping relation thereto. The washer 6 in its original form, as indicated by Fig. 2, is of larger diameter than the recess in the end of the body into which it is to be fitted, but by drawing down the seat member, the sharp edge of the lip on the latter's shoulder will cut away the superfluous portion 10 of such washer at the same time that the portion retained is forced into the recess.

An air tight fit is thus insured, while the lip protects the outer edge of the washer and is itself adapted, as the latter is compressed, to enter into the recess, should this become necessary.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of a tubular body recessed at its outer end; a seat member threaded in the outer end of the body member and formed with an external integral shoulder opposed to the recess, the shoulder being formed at its periphery with a lip having a cutting edge; a washer of packing material disposed between the shoulder and the end of the body member and adapted to be engaged by the cutting edge of the lip; and a valve member reciprocally held in the body member and coöperating with the said member.

2. In a device of the character described, the combination of a tubular body member recessed at its outer end; a seat member threaded in the outer end of the body member and formed with an external integral shoulder opposed to the recess, the shoulder being formed at its periphery with a lip having a cutting edge, the lip being adapted to telescope in the recess; a washer of packing material disposed between the shoulder and the end of the body member and adapted to be engaged by the cutting edge of the lip; and a valve member reciprocally held in the body member and coöperating with said member.

3. A valve comprising two members, one a casing and the other a seat member having a part adapted to fit into the casing, said seat member having an integral shoulder adapted to compress a packing between it and the end of the casing, and an annular recess adjacent said shoulder of less diameter than said part of the seat member which fits within the casing, one of said members having a projection with inwardly sloping sides adapted to force the washer inwardly into said annular recess as the members are pressed together.

4. A valve comprising two members, one a casing and the other a seat member having a part adapted to fit into the casing, and a part outside of the casing adapted to receive a cap or coupling, said seat member having an integral shoulder adapted to compress a packing between it and the end of the casing, one of said members having a projection with sloping sides adapted to compress the washer laterally as the members are pressed together, the maximum diameter of said seat member being less than the diameter of said casing, whereby a dust cap may fit over the end of the casing and be connected to the casing.

Signed by me, this 21st day of May, 1914.

WILBUR B. BURKE

Attested by—
  D. T. DAVIES,
  A. L. GILL.